Nov. 5, 1968
M. ANNIS ET AL
3,409,348
STUDENT LENS ASSEMBLY
Filed Dec. 6, 1965
2 Sheets-Sheet 1
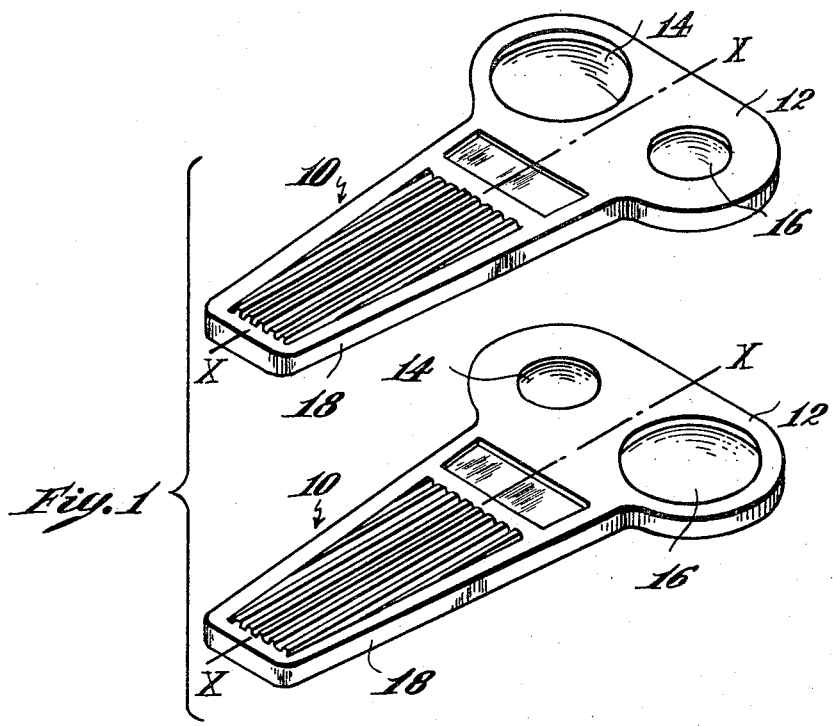
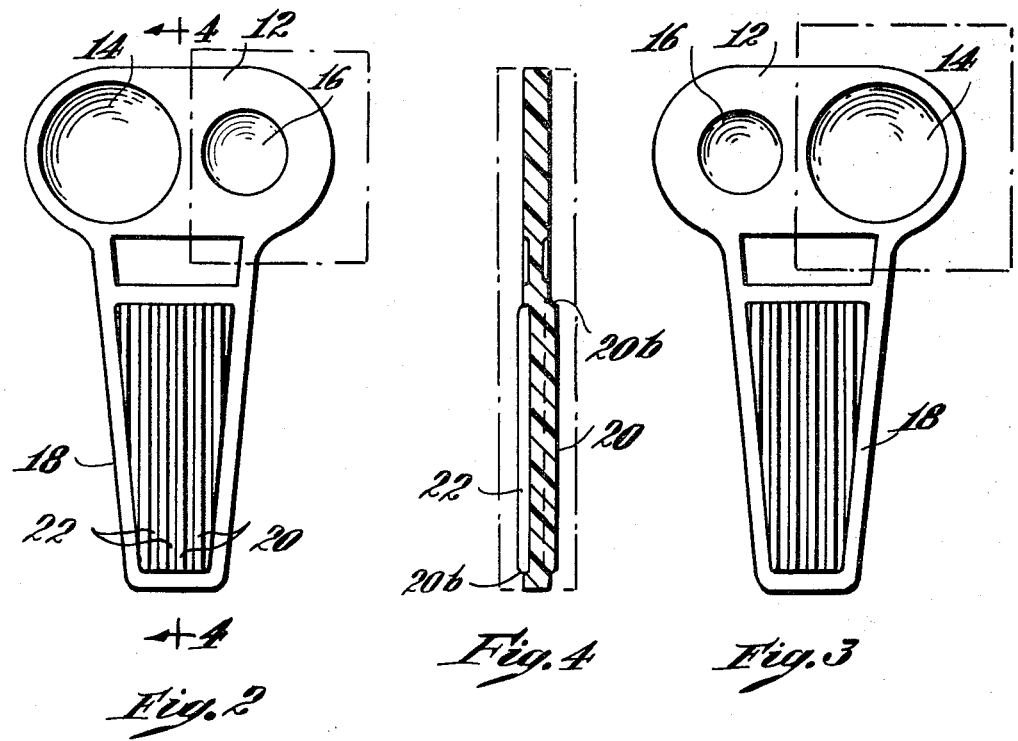

United States Patent Office 3,409,348
Patented Nov. 5, 1968

3,409,348
STUDENT LENS ASSEMBLY
Martin Annis, Newtonville, Joseph P. Pennimpede, Danvers, Raymond St. Martin, South Acton, and Edwin C. Williams, Jr., Southboro, Mass., assignors to American Science and Engineering, Inc., Cambridge, Mass., a corporation of Massachusetts
Filed Dec. 6, 1965, Ser. No. 511,774
5 Claims. (Cl. 350—254)

This invention relates to an assembly of magnifying implements for student use and has for its principal objects to provide an assembly of lenses of different magnitude to demonstrate to the student the use of single lenses of different magnitude and of the use of compound lenses of the same and different magnitude to obtain greater magnification; to provide an assembly in which the component implements are identical and are constructed and arranged to be used individually or in combination; and to provide a combination in which the implements are of attractive design, inexpensive to manufacture and durable.

As herein illustrated, the assembly is comprised of two optical implements, each embodying a holder mounting in spaced relation two lenses of different magnifying power, and means on the holders of the implements interengageably operable to hold the implements, when superposed, with the optical centers of the lenses coinciding. The holders may be superposed with corresponding sides in engagement or with opposite sides in engagement and the interengageable means is operable in either of the positions to hold the optical centers of the lenses in alignment. Each holder comprises a head substantially oval in shape in which the lenses are mounted in transversely spaced relation and a handle extending therefrom by means of which it may be held. The interengageable means are located on the handles and are in the form of a plurality of ribs and grooves. Equivalent means, of course, may be employed such as dents and detents. The implements are identical in configuration, the holders are comprised of rigid plastic and the lenses are comprised of plastic formed in the plastic head or set into holes in the head.

The invention will now be described in greater detail with reference to the accompanying drawings wherein:

FIG. 1 is a perspective view of two implements used in combination with each of the lenses of smaller magnitude opposite a lens of larger magnitude;

FIG. 2 is a plan view of one implement of the assembly showing the use of the lenses of smaller magnitude;

FIG. 3 is a plan view of the same implement or the other implement of the assembly showing the use of the lens of larger magnitude;

FIG. 4 is a section taken on the line 4—4 of FIG. 2;

Figure 5:
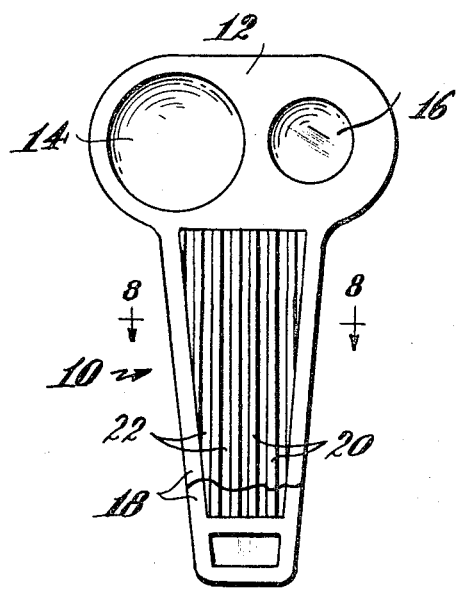
FIG. 5 is a plan view of a pair of slightly modified implements superposed and with the lenses of the same magnitude confronting each other.

Referring to the drawings (FIG. 1), the assembly is comprised of two identical implements 10, each of which embodies a substantially oval head 12 in which there are mounted two lenses 14 and 16 of different magnification and a handle 18 extending from one side of the head to enable holding the implement.

Figure 6:
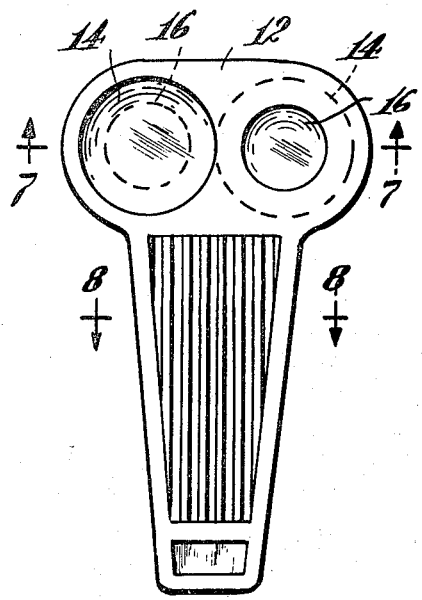
FIG. 6 is a plan view of the same pair of implements superposed and with the lenses of smaller magnitude confronting the lenses of larger magnitude.
Figure 7:
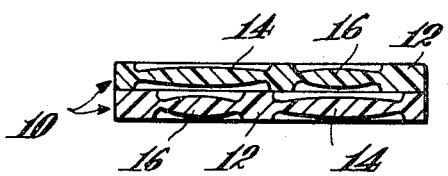
FIG. 7 is a section taken on the line 7—7 of FIG. 6.

The implements are symmetrical with respect to the line X—X as shown in FIG. 1, so that one may be placed or superposed on the other, on the one hand to compound the magnification of the individual lenses by superposing the lenses of lesser magnitude and the lenses of greater magnitude (FIG. 5) or by superposing a lens of lesser magnitude of one implement with a lens of greater magnitude of the other and vice versa (FIG. 6).

Figure 8:
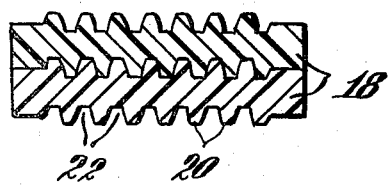
FIG. 8 is a section taken on the line 8—8 of FIGS. 5 and 6.

To obtain proper optical compounding of the lenses in either position, means is provided on the handles 18 which are interengageable when the implements are superposed to align the optical centers of the lenses with each other. This means, as shown in FIGS. 4 and 8, comprises a plurality of uniformly spaced ribs 20 and grooves 22 at the opposite faces of the handle extending longitudinally of the handle and longitudinally spaced ends 20b—20b. The interengagement of the sides of the ribs and grooves serves to locate the implements with the centers of the lenses transversely aligned and the interengagement of the ends of the ribs and grooves serves to locate the implements with the centers of the lenses longitudinally aligned.

Figure 9:
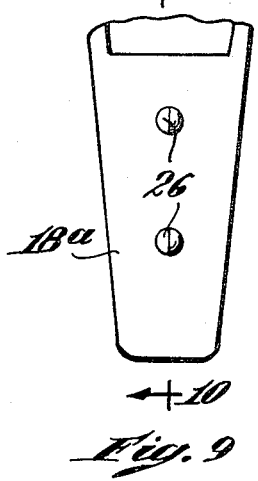
FIG. 9 is a plan view of a handle provided with alternative locating means.
Figure 10:
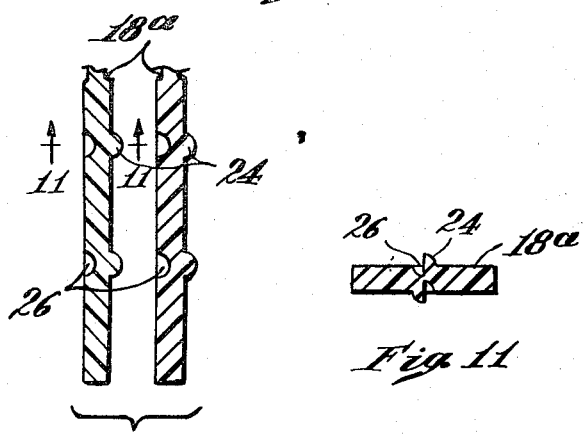
FIG. 10 is a section taken on the line 10—10 of FIG. 9.
Figure 11:
FIG. 11 is a section taken on the line 11—11 of FIG. 10.

Optionally, as shown in FIGS. 9 and 10, dents and detents 24 and 26, respectively, may be formed in the handles 18a for fixing their position relative to each other.

The head 12 and handle 18 are integrally formed, preferably of a translucent rigid plastic and the lenses are correspondingly formed of plastic which is scratch-free and bubble-free. The lenses may be formed separately from the head and set into the head or may be formed integral with the head.

The assembly as described above is designed to enable students, particularly students in the lower grades, to learn to use single lenses of different magnifying power and to use several lenses in combination. As illustrated, each implement may be used independently with either the lens of smaller magnitude or the lens of larger magnitude and the two may be used in conjunction with each other, as shown in FIGS. 5 and 6, with the two lenses of smaller magnitude aligned and the two lenses of larger magnitude aligned (FIG. 5), or with a lens of smaller magnitude of one instrument aligned with a lens of larger magnitude of the other and a lens of larger magnitude of one aligned with the lens of smaller magnitude of the other (FIG. 6). Thus, by using the combination, magnification of five different powers is available.

It should be understood that the present disclosure is for the purpose of illustration only and that this invention includes all modifications and equivalents which fall within the scope of the appended claims.

We claim:

1. An optical assembly comprised of two optical implements, each embodying a holder mounting two lenses of different magnifying power in spaced relation, and means on the holders of the implements interengageably operable to hold the implements, when superposed, with the optical centers of the lenses coinciding wherein each holder has a handle and a plurality of transversely spaced, longitudinally extending ribs and grooves on the opposite faces of said handles, interengagement of which positions the implements in such transverse relation that the centers of the lenses coincide.

2. An optical assembly according to claim 1, wherein said implements are symmetrical and positionable, on the one hand, with the lenses of larger magnitude and the lenses of smaller magnitude superposed, and, on the other hand, with each lens of larger magnitude and each lens of smaller magnitude superposed.

3. An optical assembly according to claim 1, wherein each holder has a handle and the interengageable means are on the handles.

4. An optical assembly according to claim 1, wherein each implement has a handle and the interengageable means are cooperable to locate the implements both transversely and longitudinally with the centers of the superposed lenses coinciding.

5. An optical assembly according to claim 1, wherein each implement has a handle and there are a plurality of dents and detents on the opposite faces of the handle interengageable to hold the implement superposed with the optical centers of the lenses coinciding.

References Cited

UNITED STATES PATENTS

| | | |
|---|---|---|
| 214,283 | 4/1879 | Deal. |
| 1,148,550 | 8/1915 | Thompson. |
| 1,299,750 | 4/1919 | MacLachlan. |

DAVID SCHONBERG, *Primary Examiner.*

M. J. TOKAR, *Assistant Examiner.*